United States Patent

[11] 3,536,045

| [72] | Inventor | Andrew J. Flocchini<br>7078 Lakeville Highway, Petaluma, California 94952 |
|---|---|---|
| [21] | Appl. No. | 784,715 |
| [22] | Filed | Dec. 18, 1968 |
| [45] | Patented | Oct. 27, 1970 |

[54] AUTOMATIC ELEVATED BACK-IN MILKING BARN
9 Claims, 3 Drawing Figs.

[52] U.S. Cl. .................................................. 119/27, 119/14.03
[51] Int. Cl. .................................................. A01k 01/00
[50] Field of Search ......................................... 119/14.03, 27

[56] References Cited
UNITED STATES PATENTS

| 2,236,851 | 4/1941 | Haselton | 119/14.03X |
| 2,858,800 | 11/1958 | Babson | 119/14.03 |
| 2,962,315 | 11/1960 | Gore | 119/27X |
| 3,077,860 | 2/1963 | Moores | 119/14.03 |
| 3,448,725 | 6/1969 | Holm et al. | 119/27 |

*Primary Examiner*—Aldrich F. Medbery
*Attorney*—Townsend and Townsend

ABSTRACT: An automatic elevated back-in milking barn in which there is a plurality of milking stalls and holding stalls arranged in tandem. The milking stalls are arranged in side-by-side relationship at an angle to an operator's alley depressed below the floor level of the stalls. Aligned with each milking stall is a holding stall in such a position that a cow in the holding stall can be moved backward out of the holding stall and into the milking stall. The movement of the cow is accomplished by means of a powered push gate adapted to move longitudinally along the holding stall, forcing the cow out of the holding stall and into the milking stall aligned therewith. Each holding stall is provided with spray heads for washing the cow therein prior to milking. Each of the stalls is provided with an openable gate; when the gates are closed an aisle is formed between the holding stalls and milking stalls to permit a cow to enter or exit without interfering with any of the other cows.

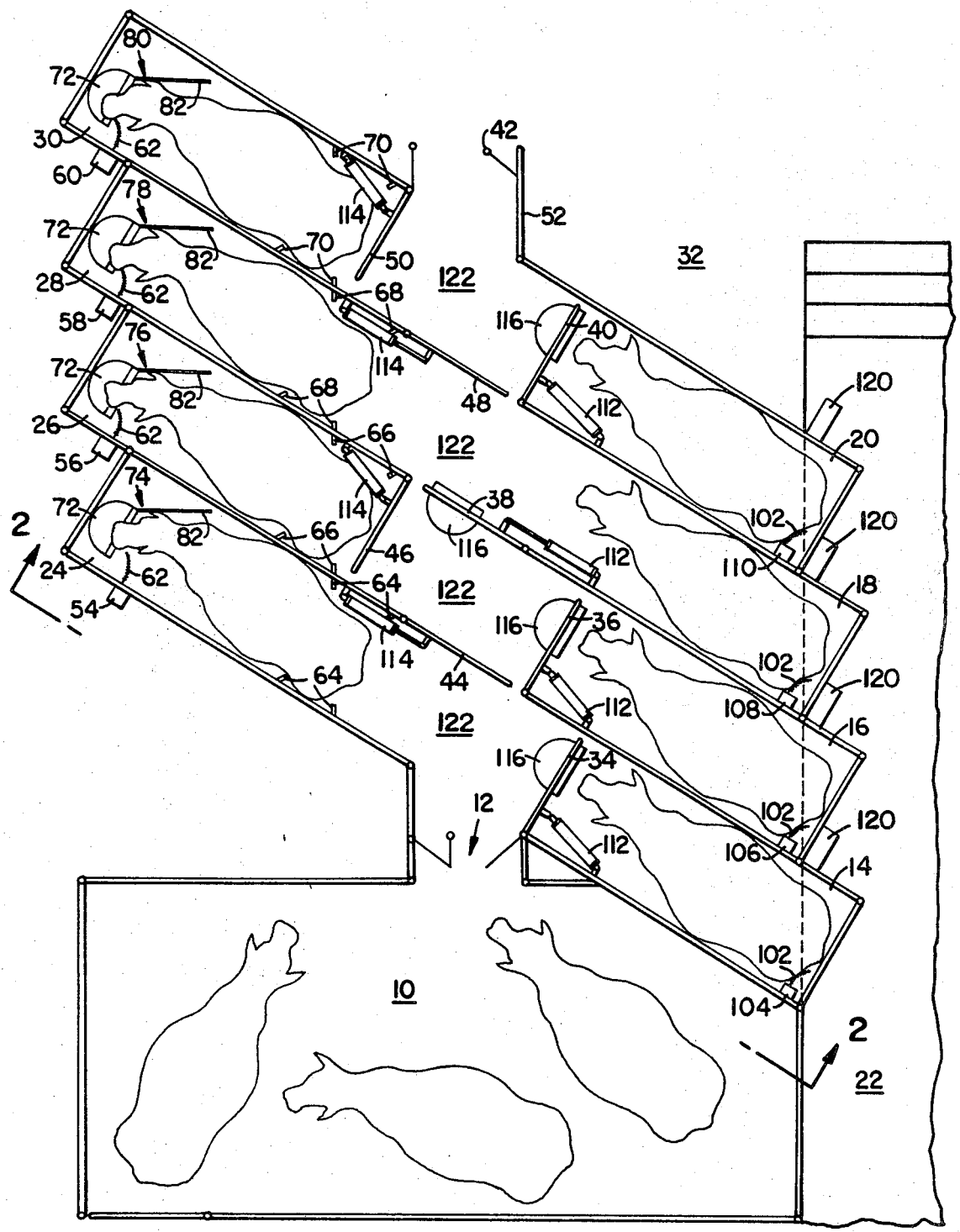
FIG_1

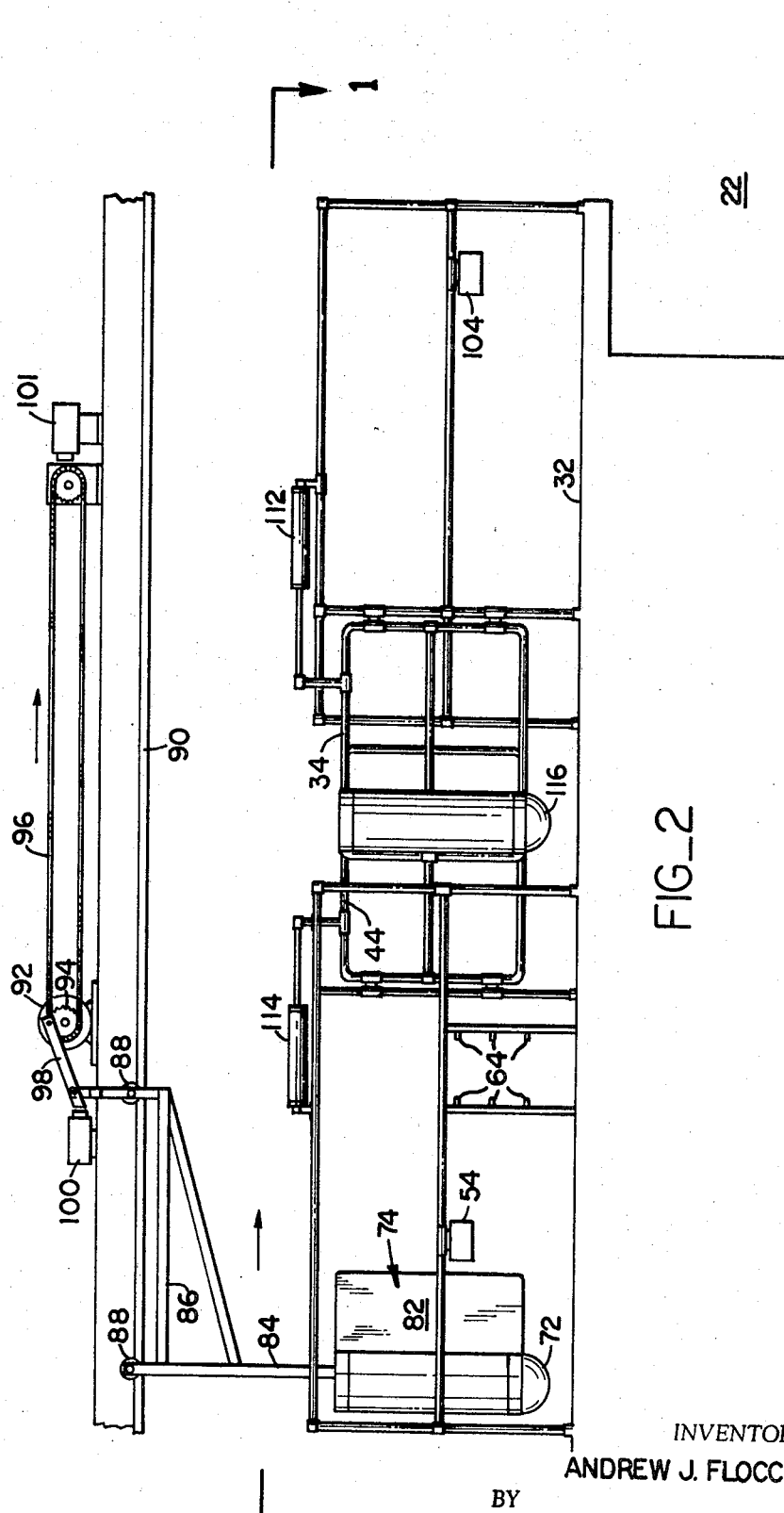
FIG_2

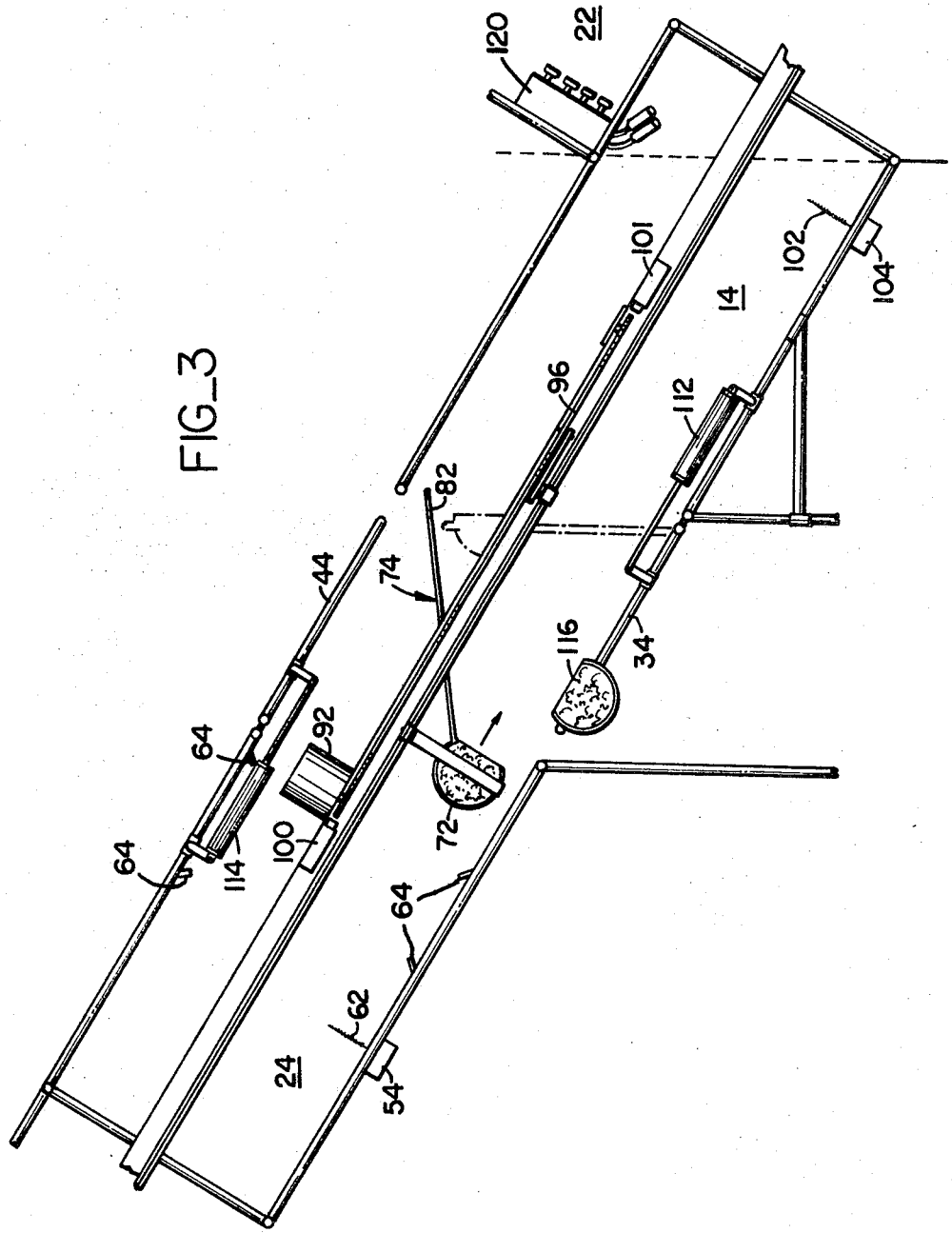

AUTOMATIC ELEVATED BACK-IN MILKING BARN

This invention relates to milking equipment and, more particularly, to an automatic elevated back-in milking barn.

There is a large variety of milking barn types, none of which is superior to others in all respects. In a typical herringbone milking barn, all the cows must be led into the individual milking stations at approximately the same time and released at approximately the same time as well. Thus, if the milking time for any single cow in the group is substantially longer than the others, all the cows would have to remain in the milking stalls until that cow has been completely milked. As a result, the total production per hour is not at a maximum.

Another type of milking barn is known as the four stall U-tandem (side opening) barn. This type of milking barn utilizes an arrangement in which there are two cows on each side of the operator's alley. The milking stalls are side opening so that a cow can enter from the rear and exit from the front of the stall. A major drawback to this type of arrangement is that there is a substantial distance between the udders of one cow and the udders of the adjacent cow. Thus, the operator has a substantial distance to cover in order to milk the four cows in the stalls properly.

There are other milking barn arrangements but the two types described above are the most popular. The present invention provides a very efficient milking arrangement in which there is a number of milking and holding stalls arranged in tandem with automatic controls provided to permit each cow, upon the completion of milking, to be released immediately so that there need be no delay in awaiting release of slower milking cows. As soon as a milked cow is released from the milking stall, the cow in the holding stall aligned with the milking stall is forced backward into the milking stall.

In an embodiment of the present invention there are four sets of tandem stalls in side-by-side relationship. There are four milking stalls disposed at an angle to a depressed operator's alley and four holding stalls, each of which is aligned, with a milking stall. Each milking stall and each holding stall is adapted to accept one cow so that a total of eight cows are being handled at one time, four being milked in the milking stalls and four being prepared for milking in the holding stalls.

Each milking stall is provided with a gate for holding the cow being milked in place. Each holding stall is provided with a push gate upon which is mounted a feed receptacle. When a cow in a milking stall has been milked, the gate on the stall opens so that the milked cow can exit. The push gate on the holding stall aligned therewith is then automatically actuated to force the cow in the holding stall to walk backwards into the milking stall. As the cow's head reaches the front portion of the milking stall, the gate on the milking stall automatically closes and forces the cow completely back so that its udders are easily reached by the operator in the alley.

The holding stalls are provided with washing facilities and udder stimulation means in addition to the feed receptacle so that the cow can be completely prepared for milking in addition to being prefed prior to being backed into the milking stall. The milking stalls are provided with gates to hold the cows in position for milking and are further provided with control means to open the gates immediately upon the completion of the milking cycle. The gate opening means can be manually actuated or, preferably, an automatic control claw such as is shown in my Pat. No. 3,373,761 can be utilized. If my automatic claw is utilized it can easily be connected into the control circuit so that immediately upon the completion of milking, when the claw control senses that the cow has been completely milked, the front gate on the milking stall is opened. Thus, immediately upon completion of milking the cow is released. When the cow has exited from the area of the stall the push gate is actuated and the cow in the adjacent holding stall is backed into the now empty stall to start the next cycle. As soon as this succeeding cow is closed into its milking stall, the gate from the corral where the cows to be milked are held is opened and another cow enters the now empty holding stall.

Because the milking stalls are in side-by-side relationship and at an angle to the operator's alley, the four cows being milked are extremely close to each other with their udders easily accessible from the operator's alley. There is no other elevated milking barn of which I am aware in which the cow's udders are as close together as in my present invention. As a result, the operator is able to utilize his time much more efficiently in attending to the cows under his supervision.

IN THE DRAWINGS

FIG. 1 is a plan view of the elevated milking barn of the present invention taken along line 1—1 of FIG. 2;

FIG. 2 is an elevational view of a holding stall and milking stall taken along line 2—2 of FIG. 1 and showing the details of the push gate mechanism; and FIG. 3 is a plan view of the holding stall and milking stall showing the detailed operation of the gates.

Referring now more particularly to the drawings in which the same reference numerals refer to corresponding parts in each of the several views, the general layout of the present invention is shown in FIG. 1. The milking barn comprises a corral 10 within which the cows which are ready to be milked are held prior to their entrance into the stalls. At the entrance to the stall area is entrance gate 12 which may be provided with the roller control mechanism such as that in my copending application Ser. No. 611,444, filed January 24, 1967, for maintaining the gate in an open position until a cow has passed completely therethrough.

Inside the entrance gate 12 is a plurality of stalls in side-by-side relationship. In the embodiment shown in the drawings there are four milking stalls 14, 16, 18 and 20 and four holding stalls 24, 26, 28 and 30. Each holding stall is aligned with a milking stall so that a cow which has been held in one of the holding stalls can be moved backward directly into a milking stall for the milking operation.

The milking stalls 14—20 have their closed ends, the right hand ends as viewed in FIG. 1, adjacent to an operator's alley 22, the alley being depressed below the level of the milking floor 32 upon which the stalls are mounted. The milking stalls 14—20 along with the adjacent holding stalls 24—30 are disposed at an angle to the operator's alley so that the udders of each of the cows in the milking stalls are close to the operator's alley 22 to permit the operator to apply the milking equipment easily.

Each of the milking stalls is provided with a pivotally mounted gate 34—40 at the end of the milking stall opposite its closed end. The holding stalls 24—30 have a closed end distal the milking stalls and an open end proximate the milking stall, each of the holding stalls being provided with a pivotally mounted gate 44—50. The space between the holding stalls and the milking stalls defines a passageway 122 through which cows may enter and leave the stalls. In addition to the gates already noted there is provided an exit gate 52 to permit the milked cows to return to their holding corrals. The exit gate 52 is also provided with the roller control mechanism of my copending patent application in order to maintain the gate in an open position until a cow has passed completely through the gate.

Near the closed end of each of the holding stalls 24—30 a switch 54—60 is mounted, each of the switches being provided with the feeler 62 which a cow entering the holding stall will touch to actuate the switch. Each of the holding stalls is also provided with spray nozzles 64—70 in order to permit the cow in the holding stall to be washed and stimulated prior to milking.

An important additional feature of the present invention are the push gates 74—80 disposed at the closed end of each holding stall and adapted to be moved axially along the holding stall in order to push a cow backward from the holding stall into its corresponding milking stall.

Each push gate comprises a feed receptacle 72 together with a deflecting shield 82. The deflecting shield 82 forms the main part of the push gate to force the cow backward and, in addition, directs the cow's head toward the feed.

The feed receptacle 72 and the deflecting shield 82 are mounted together on a vertical frame member 84 suspended from a trolley 86 having rollers 88 at the ends thereof. The rollers 88 have a V-shaped depression in the periphery thereof to accommodate an angle iron 90 which serves as the track along which the trolley moves. The motive power for the push gate is provided by an electric motor 92 having a sprocket 94 upon which is carried a roller chain 96. A link 98 attached to the chain and to the trolley causes the gate to be pulled along by movement of the roller chain under power from the motor 92. Limit switches 100 and 101 located at the opposite ends of the roller chain 96 are actuated by movement of the linkage in order to effect automatic shutoff of the motor when the push gate has reached the maximum desired movement in either direction.

In addition to the equipment heretofore described, the milking stalls are provided with switches 104—110, each having a feeler 102 thereon for sensing when a cow has been completely backed into the milking stall. The function of these switches will be explained below. Each of the gates 34—40 on the milking stalls is moved by means of a vacuum or hydraulic cylinder 112 which may either be double acting, that is requiring power to move it in either direction, or may be spring loaded so that the gate will be normally closed and require hydraulic pressure or connection to a vacuum supply in order to open the gate. The gates on the holding stalls are also moved by means of hydraulic or vacuum cylinders 114 which may be spring loaded in the same manner as the cylinders 112. Additionally, the gates 34—40 on the milking stalls have feed receptacles 116 mounted thereon.

OPERATION OF THE APPARATUS

The elements of an embodiment of the invention having been described, a brief description of the operation of the total apparatus is desirable. The cows to be milked are held in the corral 10. The control for the commencement of the milking operation will be by means of a manual pushbutton (not separately shown) which will cause gate 12 to open to permit the first cow to enter the stall area. When the pushbutton is operated, gate 12 opens and all the holding stall gates, that is gates 44—50, also open to the position shown by gates 44 and 48 in FIG. 1. The gates 34—40 on the milking stalls would remain in the normally closed position shown by gates 34, 36 and 40 in FIG. 1. Thus, the first cow to enter the milking area will be able to enter only holding stall 24. As has been noted before, gate 12 is provided with the roller switch shown in one of my copending patent applications. The roller switch will keep the gate open until the cow has passed through and then permit the gate to reclose when the cow has passed through the gate.

When the cow moves forward into holding stall 24 it will brush against the feeler 62 connected to control switch 54 which actuates the switch. The actuation of switch 54 will cause gate 44 to close and gate 12 to reopen to admit a second cow. The second cow then will pass through open gate 12 and through the passageway formed between closed gate 44 and 34 and into holding stall 26, the only stall open. This sequence is followed until four cows are in holding stalls 24—30.

When the first cow enters holding stall 24 and trips switch 54, not only does this cause gate 44 to close, but it also starts the water flowing through the spray heads 64 to completely wash down the rear portion of the cow prior to milking. In addition to the washing sprayheads 64 in the holding stall 24, there may also be provided additional sprayheads (not separately shown) for stimulating the udders of the cow immediately prior to the milking operation. Each of the holding stalls is provided with a feeler 62 connected to a switch to actuate the washing apparatus, the letdown stimulating apparatus and to close the gate of the stall as well as reopen entrance gate 12. The sprayheads in each of the holding stalls are connected through separate control mechanisms (not separately shown) which will control the washing of each of the cows for a preselected amount of time, shutting off automatically to permit letdown stimulation should that be desired, and also permitting the cow to dry off prior to being moved into the milking stall. In addition to the washing and letdown stimulation in each of the holding stalls there is provided a feed receptacle 72 as part of the push gate at the head end of each of the holding stalls. A preselected amount of feed is available in each of the feed receptacles so that each of the cows is prefed prior to the milking operation. If desired, the feed receptacles 72 may be supplied from overhead augers or other well-known feed supply mechanisms in order to more fully automate the milking barn operation.

After the fourth cow has entered the holding stall 30, and if the washing and letdown stimulation has been completed for the cow in the first stall 24, gate 44 will open as is shown in FIG. 1 and the gate 34 on the milking stall 14 will be opened to the position shown in FIG. 3 so that the cow may be backed from the holding stall 24 directly into milking stall 14. In order to accomplish this the push gate 74 is automatically actuated by energizing the motor 92 in order to cause the gate to move longitudinally along the holding stall. Movement of the gate will force the cow backward and out of holding stall 24 and into milking stall 14. When the push gate 74 reaches the end of the holding stall as is shown in FIG. 3, limit switch 101 is actuated to cause gate 34 to begin to close, thus the cow will be forced backward fully into the milking stall 14 first by movement of the push gate 74 and then by the closing of gate 34 on the milking stall. The closing movement of gate 34 may be halted at any position along the arc of its traverse through actuation of switch 104 when the rump of the cow in stall 14 touches feelers 102 connected to switch 104. Thus, if a large cow is to be milked gate 34 will not close fully (as is shown in FIG. 1) but may assume an intermediate position as illustrated by the dotted lines in FIG. 3. Thus, no matter what size cow is to be milked, it will always be securely held in position in the milking stall with its rump close to the portion of the milking stall adjacent the operator's alley 22.

After the cow has been moved from holding stall 24 into milking stall 14 the next cow in holding stall 26 is moved backward into milking stall 16 in the same manner. This sequence is continued until each of the milking stalls is filled. As each cow is locked into a milking stall the operator will attach the teat cups of the milking machine to commence the milking operation. If these teat cups are connected to an automatic control mechanism 120 such as is shown in my U.S. Pat. No. 3,373,761 the release of the milked cow upon completion of the milking cycle will be automatic. This is accomplished by arranging for connection of the gate controls to the electronic controls of the automatic mechanism 120. Thus, when all four quarters of the cow's udder are milked and the vacuum to each of the teat cups shutoff, the gate of the milking stall will open automatically, permitting the cow to exit without awaiting the operator's manual actuation of the gate.

When a cow is milked and released from the milking stall, it will move out of the milking stall and between the closed gates of the milking stalls and the holding stalls. These closed gates form a passageway 122 between the milking stalls and the holding stalls. The released cow will move along passageway 122 until it exits through gate 52 toward the holding corrals. As soon as a milked cow has exited through gate 52, the push gate on the holding stall corresponding to the now empty milking stall will be actuated and a prefed cow ready to be milked will be moved into position in the milking stall as described above. In addition to the prefeeding accomplished by the feed receptacles 72, which are part of the push gate assemblies, each of the milking stall gates is provided with a feed receptacle 116 in order to permit the cow being milked to be fed at the same time. This is in accordance with the generally accepted procedure in which the amount of feed given to a cow is proportional to its milk production, with heavy milkers being given larger quantities of feed.

In order to preclude any confusion in the movement of the cows each pair of stalls, that is a holding and a milking stall in tandem, is interlocked with the other pairs of stalls so that one cow will exit and a fresh cow be brought into position in the holding stall after operation of the push gate prior to another cow being released from its milking stall.

The use of the present invention permits each cow to be prefed in the holding stall and also to be washed and have its udders stimulated with sufficient time subsequent to the washing for the cow to dry prior to being milked. The prefeeding arrangement in the holding stall, in addition to the feeding arrangement in the milking stall will result in substantial improvement in milk production. The primary advantage of the present invention is the virtually automatic handling of the cows being milked in addition to the extremely advantageous arrangement of the stalls so that a single operator will be able to handle a maximum number of cows. With the present arrangement the cows are closer together than in any other elevated barn type.

I claim:

1. Apparatus for milking a cow comprising: a milking stall and a holding stall, said stalls being aligned in end-to-end relation, said holding stall having a means affording ingress for a cow to be milked and means for moving along the length of the holding stall to force a cow therein rearward from the holding stall into the milking stall, and means affording egress of a milked cow from the milking stall.

2. The milking apparatus of claim 1 wherein the holding stall and milking stall are spaced apart to form a passageway therebetween for ingress and egress of cows.

3. The milking apparatus of claim 1 wherein the ingress means comprises an openable gate at one end of the holding stall and the egress means comprises an openable gate at one end of the milking stall.

4. Milking barn apparatus comprising: a plurality of milking stalls in side-by-side relationship; an equal number of holding stalls, each holding stall longitudinally aligned with a milking stall; said milking stalls and said holding stalls defining a passageway therebetween; means for opening each holding stall to permit a cow to enter; means for forcing a cow in a holding stall to move backward into the milking stall aligned therewith; gate means for each milking stall for holding a cow in the milking stall for milking; and means to open the milking stall gate after a cow therein has been milked to permit the cow to exit.

5. The apparatus of claim 4 and including an operator's alley and a milking floor adjacent to and raised above the alley, the milking stalls and holding stalls mounted on the milking floor and disposed at an acute angle to the operator's alley, the rear portion of the milking stalls adjacent the alley.

6. The apparatus of claim 4 and wherein the means for forcing a cow backward from the holding stall comprises a feed box movable between the head end of the holding stall and the end remote from the head end and power means for moving the feed box along the holding stall until the cow is out of the holding stall.

7. A milking barn comprising: an operator's alley; a plurality of milking stalls, each having one end adjacent the alley, the other end of each milking stall having a gate thereon; a plurality of holding stalls, each holding stall longitudinally aligned with a milking stall, and a gate on the end of the holding stall nearest the milking stall for closing the holding stall, the other end of the holding stall provided with means for forcing a cow out of the holding stall and into the milking stall aligned with the holding stall.

8. The milking barn of claim 7 and including milking means mounted at each milking stall, said milking means having measuring means connected therewith for determining when the cow in the milking stall has been fully milked, and means responsive to the measuring means for opening the gate at the end of the milking stall to permit the cow therein to exit.

9. The milking barn of claim 7 and wherein the holding cell forcing means is provided with a feed receptacle and the milking stall gate is provided with a feed receptacle.